(12) United States Patent
Nakahama et al.

(10) Patent No.: US 12,425,536 B2
(45) Date of Patent: *Sep. 23, 2025

(54) RECEPTION DEVICE, METHOD FOR CONTROLLING RECEPTION DEVICE, AND TRANSMISSION/RECEPTION SYSTEM

(71) Applicant: SATURN LICENSING LLC, New York, NY (US)

(72) Inventors: Masahiko Nakahama, Kanagawa (JP); Nobutaka Yamamoto, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,899

(22) Filed: Oct. 13, 2023

(65) Prior Publication Data

US 2024/0040079 A1    Feb. 1, 2024

Related U.S. Application Data

(63) Continuation of application No. 17/778,959, filed as application No. PCT/JP2020/046140 on Dec. 10, 2020, now Pat. No. 11,818,499.

(30) Foreign Application Priority Data

Dec. 17, 2019 (JP) ................. 2019-226931

(51) Int. Cl.
*H04N 7/01* (2006.01)
*H04N 7/015* (2006.01)
*H04N 7/10* (2006.01)

(52) U.S. Cl.
CPC ........... *H04N 7/0125* (2013.01); *H04N 7/015* (2013.01); *H04N 7/10* (2013.01)

(58) Field of Classification Search
CPC ........ H04N 7/0125; H04N 7/015; H04N 7/10; H04N 21/4516; H04N 21/43635;
(Continued)

(56) References Cited

U.S. PATENT DOCUMENTS 11,818,499 B2 * 11/2023 Nakahama ........... H04N 7/0125
2008/0266456 A1   10/2008 Miyoshi
(Continued)

FOREIGN PATENT DOCUMENTS

CN        105072491        11/2015
CN        106134210        11/2016
(Continued)

OTHER PUBLICATIONS

International Search Report for PCT/JP2020/046140 dated Feb. 22, 2021. 3 pgs.
(Continued)

*Primary Examiner* — Michael Lee
(74) *Attorney, Agent, or Firm* — Richard LaPeruta

(57) ABSTRACT

The present technology is to enable a transmitter device to read appropriate device information (EDID) from a receiver device with a reduced burden on the user.

A memory unit that stores first device information and second device information, and a communication unit that communicates with an external device are included. The control unit determines to cause the external device to read the second device information, on the basis of reception of a rewrite signal for the first device information from the external device. It is possible to cause the external device (a transmitter device) to read appropriate device information (EDID) from a receiver device (a reception device) with a reduced burden on the user, and thus, user-friendliness can be increased.

20 Claims, 10 Drawing Sheets

(58) Field of Classification Search
CPC ........... H04N 21/43615; H04N 21/442; G09G 2370/042; G09G 2370/12; G09G 5/005; G09G 5/006
See application file for complete search history.

(56) References Cited

U.S. PATENT DOCUMENTS

| | | |
|---|---|---|
| 2009/0077606 A1 | 3/2009 | Machida et al. |
| 2011/0004911 A1 | 1/2011 | Kabuto et al. |
| 2012/0229653 A1 | 9/2012 | Lien et al. |
| 2013/0117491 A1* | 5/2013 | Hwang ............... G06F 13/4068 710/316 |
| 2014/0003794 A1 | 1/2014 | Hoshino et al. |
| 2015/0264317 A1 | 9/2015 | Takahashi |
| 2017/0280184 A1 | 9/2017 | Kozuka et al. |
| 2018/0047370 A1 | 2/2018 | Chiang et al. |
| 2019/0354356 A1* | 11/2019 | Watanabe ............. G06F 3/1454 |
| 2020/0296449 A1* | 9/2020 | Suzuki ............. H04N 21/43635 |

FOREIGN PATENT DOCUMENTS

| | | |
|---|---|---|
| JP | 2016163238 A | 9/2016 |
| JP | 2017515333 A | 6/2017 |
| WO | 2017151925 A1 | 9/2017 |

OTHER PUBLICATIONS

Hdmi Forum: "High-Definition Multimedia Interface Specification Version 2.0", Sep. 4, 2013 (Sep. 4, 2013), XP055388172, Retrieved from the Internet: URL:hdmiforum.org [retrieved on Jul. 5, 2017].

* cited by examiner

FIG. 4

| Link Rate Identifier (Decimal) | Link Rate Identifier (Binary) | Number of Active Lanes | Bitrate per Lane (Gbps) |
|---|---|---|---|
| 1 | 0001 | 3 | 3 |
| 2 | 0010 | 3 | 6 |
| 3 | 0011 | 4 | 6 |
| 4 | 0100 | 4 | 8 |
| 5 | 0101 | 4 | 10 |
| 6 | 0110 | 4 | 12 |

| Syntax | No. of Bytes |
|---|---|
| AKE_Init { | |
| msg_id (=2) | 1 |
| rrx [63..0] | 8 |
| TxCaps | 3 |
| } | |

(b)

Msg_id : MESSAGE IDENTIFIER INDICATING MESSAGE IS AKE_Init rrx [63..0]: PSEUDORANDOM VALUE TxCaps : FIXED VALUE (0x02 0x00 0x00)

RECEPTION DEVICE, METHOD FOR CONTROLLING RECEPTION DEVICE, AND TRANSMISSION/RECEPTION SYSTEM

CROSS-REFERENCE TO RELATED APPLICATIONS

The present application is a continuation of U.S. patent application Ser. No. 17/778,959, filed on May 23, 2022, which application is a national phase entry under 35 U.S.C. § 371 of International Application No. PCT/JP2020/046140 filed Dec. 10, 2020, which claims priority from Japanese Patent Application No. 2019-226931 filed on Dec. 17, 2019, all of which are hereby incorporated herein by reference.

TECHNICAL FIELD

The present technology relates to a reception device, a method for controlling a reception device, and a transmission/reception system, and more particularly, to a reception device and the like with increased user-friendliness.

BACKGROUND ART

In the current market, there are transmitter devices (source devices) that are incapable of decoding HDMI forum vendor specific data blocks (HF-VSDBs) newly defined in extended display identification data (EDID) by high-definition multimedia interface (HDMI) 2.0. Therefore, a television receiver that is a receiver device (a sink device) has a specification in which the user manually switches between the EDID for "transmitter devices compatible with HDMI 1.4 or older" and the EDID for "transmitter devices compatible with HDMI 2.0" for use. Note that HDMI 2.0 also includes HDMI 2.0a and HDMI 2.0b herein. Further, HDMI 1.4 also includes HDMI 1.4a.

For example, Patent Document 1 describes HDMI 2.1. In HDMI 2.1, transmission by a fixed rate link (FRL) is specified. In HDMI 2.1, image data is also transmitted in the form of a packet, an operation called FRL link training is performed before the image data and audio data are transmitted, and a transmission rate (a clock rate) suitable for the capability of the transmission path including an HDMI cable between the transmitter device and the receiver device is set.

SUMMARY OF THE INVENTION

It is not possible to combine (merge) the EDID for "transmitter devices compatible with HDMI 2.0" and the EDID for "transmitter devices compatible with HDMI 2.1" with the currently used 256-byte EDID, and support them with one set of EDID data. Therefore, it is necessary to enable switching among the EDID for "transmitter devices compatible with HDMI 1.4 or older", the EDID for "transmitter devices compatible with HDMI 2.0", and the EDID for "transmitter devices compatible with HDMI 2.1" for use.

Under such circumstances, at both a transmitter device compatible with HDMI 2.0 and a transmitter device compatible with HDMI 2.1, content protection is conducted by high-bandwidth digital content protection (HDCP) 2.2. Therefore, even if an operation performed by HDCP 2.2 is monitored, any determination condition for selecting between the EDID for "transmitter devices compatible with HDMI 2.0" and the EDID for "transmitter devices compatible with HDMI 2.1" cannot be set.

As described above, according to HDMI 2.1, an operation called FRL link training is performed. When this FRL link training is performed, communication is conducted between the transmitter device and the receiver device via a display data channel (DDC) line. Therefore, if communication through the DDC line is monitored, it can be detected that HDMI transmission is about to be performed between the transmitter device and the receiver device by HDMI 2.1, and this can be set as a condition for selecting the EDID for "transmitter devices compatible with HDMI 2.1".

An object of the present technology is to enable a transmitter device to read appropriate device information (EDID) from a receiver device with a reduced burden on the user.

The concept of the present technology lies in a reception device that includes:

a memory unit that stores first device information and second device information;

a communication unit that communicates with an external device; and a control unit that determines to cause the external device to read the second device information, on the basis of reception of a rewrite signal for the first device information from the external device.

The reception device of the present technology may be a display device, for example. Further, the reception device of the present technology includes the memory unit that stores first device information and second device information, and the communication unit that communicates with the external device. For example, the first device information may be information included in a status and control data channel structure (SCDCS). In this case, the first device information may be FRL_Rate, which is information regarding a link rate selected by the external device, for example. Furthermore, the communication unit may communicate with the external device through a digital interface cable, for example. In this case, the digital interface cable may be a high-definition multimedia interface (HDMI) cable, for example.

The control unit determines to cause the external device to read the second device information, on the basis of reception of the rewrite signal for the first device information from the external device. For example, the rewrite signal may be determined depending on the second device information. In this case, the rewrite signal may be Max_FRL_Rate, which is information regarding the link rates supported by the device, Max_FRL_Rate being written in the second device information, for example.

As described above, according to the present technology, reading of the second device information by the external device is determined on the basis of reception of the rewrite signal for the first device information from the external device. Accordingly, It is possible to cause the external device (a transmitter device) to automatically read appropriate device information (EDID) from a receiver device (the reception device), and thus, user-friendliness can be increased.

Note that the rewrite signal may be transmitted in accordance with the value of FLT_ready, which is information indicating the preparation status of a link training process, FLT_ready being written in the first device information. Further, according to the present technology, the memory unit may further store third device information, for example, and, in a case where the rewrite signal is not received, the control unit may determine to cause the external device to read the third device information. In this case, the second device information may be information compliant with version 2.1 of high-definition multimedia interface (HDMI), and the third device information may be information compliant with version 2.0 of HDMI, for example.

In this case, each of the second device information and the third device information may be extended display identification data (EDID) including an HDMI forum vendor specific data block (HF-VSDB) that is information regarding the functions supported by the device. Further, in this case, the second device information may be 512-byte EDID obtained by combining (merging) EDID for 4K high frame rate (HFR) and EDID for 8K.

Furthermore, the memory unit may further store fourth device information, for example, and, in a case where the external device is compatible with neither the second device information nor the third device information, the control unit may determine to cause the external device to read the fourth device information. In this case, when a predetermined signal is not received from the external device, the control unit may determine that the external device is compatible with neither the second device information nor the third device information. Further, in this case, the predetermined signal may be AKE_Init, which is a start signal for an authentication process with the external device. Furthermore, the fourth device information may be information compliant with version 1.4 or older of high-definition multimedia interface (HDMI), for example. Further, in this case, the fourth device information may be extended display identification data (EDID) including a vendor specific data block (VSDB) that is information regarding the functions supported by the device.

BRIEF DESCRIPTION OF DRAWINGS

FIG. 4 is a table showing an example of link rates and the numbers of lanes corresponding to the respective links according to HDMI 2.1.

FIG. 9 is tables showing an example structure of "AKE_Init", and the contents of relevant information in the example structure.

DETAILED DESCRIPTION

The following is a description of a mode for carrying out the invention (the mode will be hereinafter referred to as the "embodiment"). Note that explanation will be made in the following order.
1. Embodiment
2. Modifications

1. EMBODIMENT

[Example Configuration of a Transmission/Reception System]

Figure 1:
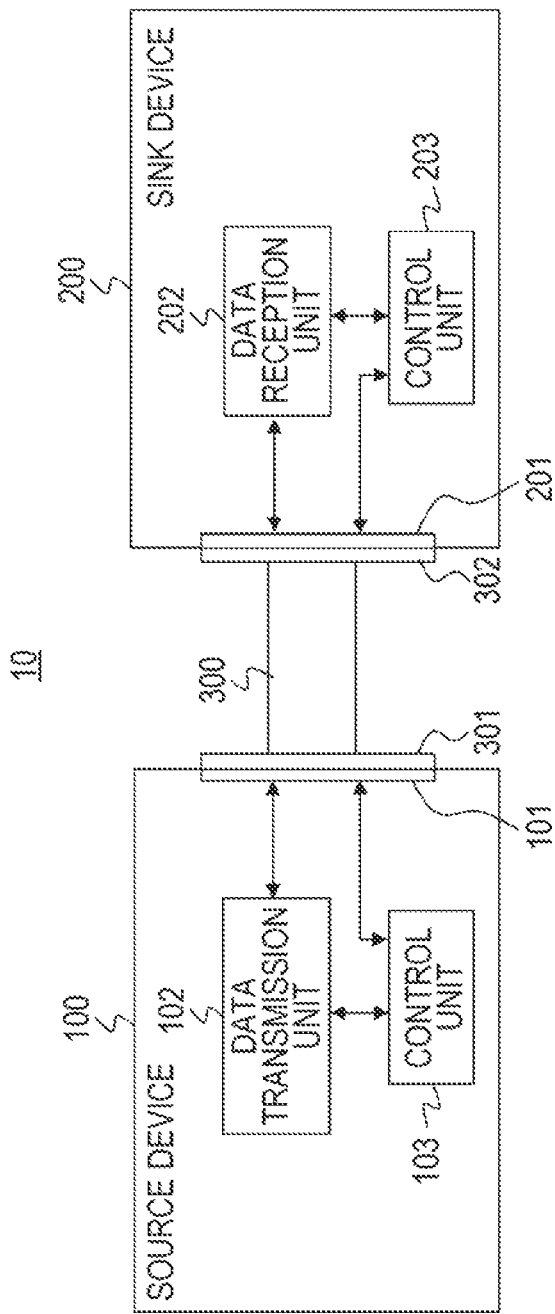
FIG. 1 is a block diagram showing an example configuration of a transmission/reception system as an embodiment.

FIG. 1 shows an example configuration of a transmission/reception system as an embodiment. This transmission/reception system 10 includes a source device (transmission device) 100 and a sink device (reception device) 200 that are connected to each other. The source device 100 is a game machine, a disk player, a set-top box, a digital camera, a mobile telephone, a personal computer, or the like, for example. The sink device 200 is a display device such as a television receiver, a PC monitor, or a projector, for example.

The source device 100 and the sink device 200 are connected via an HDMI cable 300 that is a digital interface cable. The source device 100 includes a receptacle 101 that forms a connector and has a data transmission unit 102 connected thereto. The sink device 200 includes a receptacle 201 that forms a connector and has a data reception unit 202 connected thereto. Further, a plug 301 forming a connector is provided at one end of the cable 300, and a plug 302 forming a connector is provided at the other end. The plug 301 at the one end of the cable 300 is connected to the receptacle 101 of the source device 100, and the plug 302 at the other end of the cable 300 is connected to the receptacle 201 of the sink device 200.

The source device 100 includes a control unit 103. This control unit 103 controls the entire source device 100. The data transmission unit 102 is compatible with HDMI 1.4 or older, HDMI 2.0, or HDMI 2.1. The sink device 200 includes a control unit 203. This control unit 203 controls the entire sink device 200. This control unit 203 controls the data reception unit 202 to cause the source device 100 to read the EDID compatible with the version of the HDMI.

When determining the data transmission unit 102 to be compatible with HDMI 2.1, the control unit 203 determines to cause the data transmission unit 102 to read the EDID for HDMI 2.1. In this case, the data transmission unit 102 reads the EDID for HDMI 2.1 set in an EDID ROM in the data reception unit 202.

Further, when determining the data transmission unit 102 to be compatible with HDMI 2.0, the control unit 203 determines to cause the data transmission unit 102 to read the EDID for HDMI 2.0. In this case, the data transmission unit 102 reads the EDID for HDMI 2.0 set in the EDID ROM in the data reception unit 202.

Further, when determining the data transmission unit 102 to be compatible with HDMI 1.4 or older, the control unit 203 determines to cause the data transmission unit 102 to read the EDID for HDMI 1.4 or older. In this case, the data transmission unit 102 reads the EDID for HDMI 1.4 or older set in the EDID ROM in the data reception unit 202.

Figure 2:
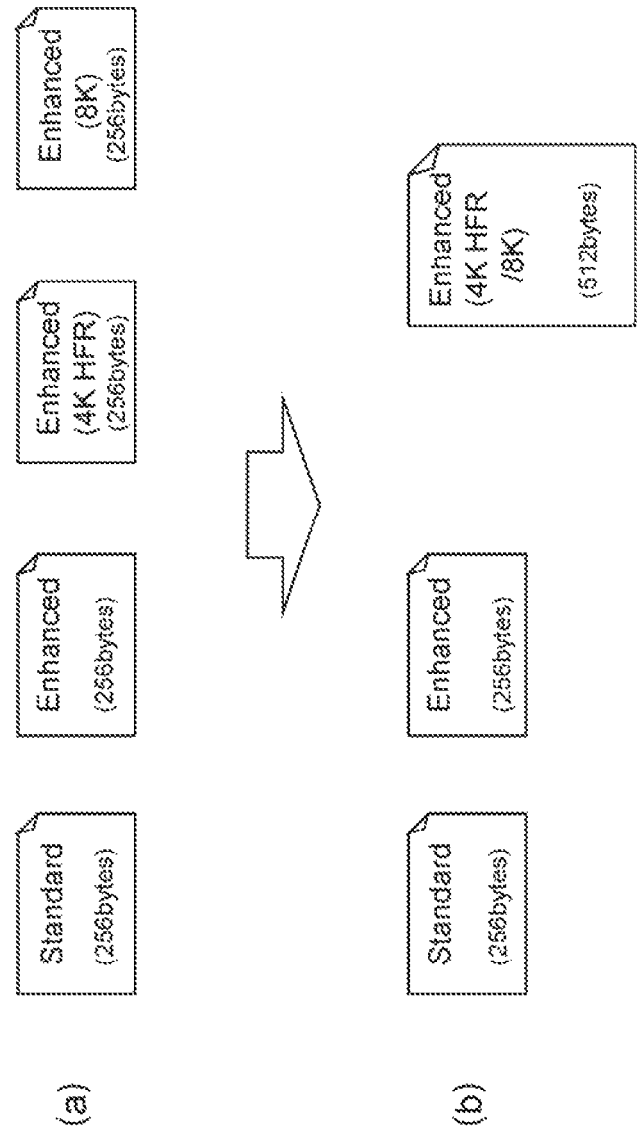
FIG. 2 is a diagram for explaining EDIDs compatible with HDMI 1.4 or older, HDMI 2.0, and HDMI 2.1.

As shown in FIG. 2, part (a), in an embodiment, there is 256-byte EDID "Standard" as the EDID for HDMI 1.4 or older, there is 256-byte EDID "Enhanced" as the EDID for HDMI 2.0, and there are 256-byte EDID "Enhanced (4K HFR)" and 256-byte EDID "Enhanced (8K)" as the EDID for HDMI 2.1. Here, for example, EDID "Enhanced" includes device information corresponding to a 4K resolution video image and a high dynamic range (HDR) video image with frame rates up to 60 Hz, and EDID "Enhanced (4K HFR)" and EDID "Enhanced (8K)" include device information corresponding to a 4K (3840×2160) resolution video image and a 8K (7680×4320) resolution video image each having a high frame rate (HFR) that is higher than 60 Hz. Each EDID mentioned above is also referred to as Enhanced-EDID (E-EDID) in some cases.

Meanwhile, another embodiment handles 256-byte EDID "Standard" as the EDID for HDMI 1.4 or older, 256-byte EDID "Enhanced" as the EDID for HDMI 2.0, and 512-byte EDID "Enhanced (4K HFR/8K)" as the EDID for HDMI 2.1, as shown in FIG. 2, part (b). This 512-byte EDID "Enhanced (4K HFR/8K)" is obtained by combining (merging) 256-byte EDID "Enhanced (4K HFR)" and 256-byte EDID "Enhanced (8K)".

Here, the EDID for HDMI 1.4 or older includes Vendor Specific Data Block (VSDB) that is vendor-specific information that includes information regarding the functions supported by the sink device. Also, the EDIDs for HDMI 2.0 and HDMI 2.1 include HDMI Forum VSDB (HF-VSDB), which is an extended VSDB.

Figure 3:
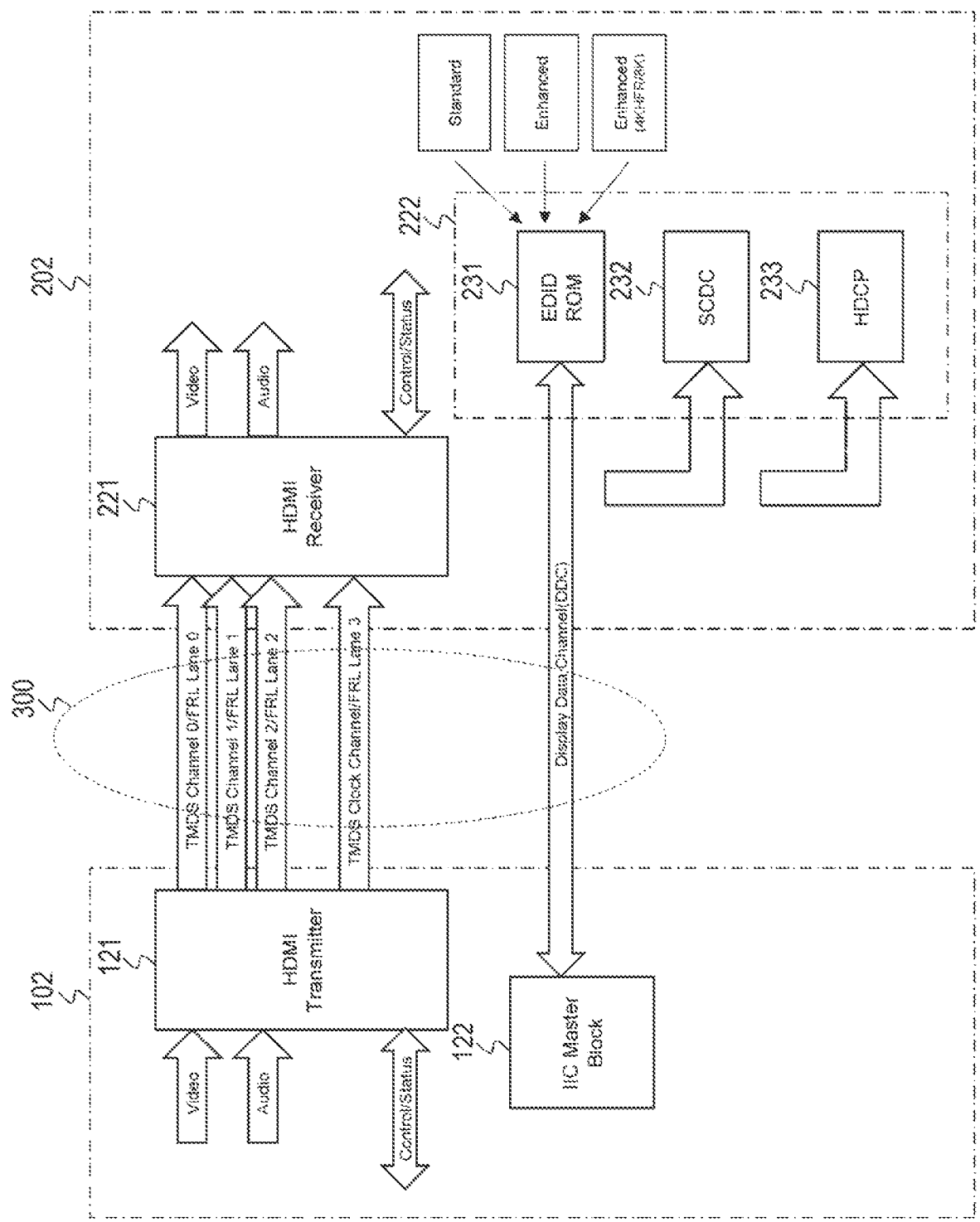
FIG. 3 is a block diagram showing an example configuration of a data transmission unit (HDMI transmission unit) of a source device and a data reception unit (HDMI reception unit) of a sink device.

Example Configurations of the Data Transmission Unit and the Data Reception Unit FIG. 3 shows an example configuration of the data transmission unit (HDMI transmission unit) 102 of the source device 100, and the data reception unit (HDMI reception unit) 202 of the sink device 200 in the transmission/reception system 10 in FIG. 1.

In an effective image interval (hereinafter also referred to as the active video interval, where appropriate) that is an interval calculated by subtracting a horizontal blanking interval and a vertical blanking interval from the interval from one vertical synchronization signal to the next vertical synchronization signal, the data transmission unit 102 unidirectionally transmits a differential signal corresponding to uncompressed pixel data of an image of one screen to the data reception unit 202 through a plurality of channels. In the horizontal blanking interval or the vertical blanking interval, the data transmission unit 102 also unidirectionally transmits a differential signal corresponding to at least the audio data and the control data accompanying the image, other auxiliary data, and the like, to the data reception unit 202 through the plurality of channels.

Specifically, the data transmission unit 102 includes an HDMI transmitter 121. The HDMI transmitter 121 converts uncompressed pixel data of an image into the corresponding differential signal, for example, and unidirectionally and serially transmits the differential signal to the data reception unit 202 connected thereto via the HDMI cable 300, through a plurality of channels that are three TMDS channels #0, #1, and #2.

The HDMI transmitter 121 also converts the uncompressed audio data accompanying the image, as well as necessary control data, other auxiliary data, and the like, into the corresponding differential signal, and unidirectionally and serially transmits the differential signal to the data reception unit 202 connected thereto via the HDMI cable 300, through the three TMDS channels #0, #1, and #2.

Further, the HDMI transmitter 121 transmits pixel clocks synchronized with the pixel data being transmitted through the three TMDS channels #0, #1, and #2, to the data reception unit 202 connected thereto via the HDMI cable 300, through a TMDS clock channel. Here, in one TMDS channel #i (i=0, 1, 2), 10-bit pixel data is transmitted in one clock of the pixel clocks.

Here, TMDS coding is 8-bit/10-bit conversion coding for converting 8-bit data into 10-bit data, and is coding for maintaining DC balance while restricting adverse effects such as unnecessary radiation by reducing transition points from comparison with previous data. Because of that, the run-length of coding cannot be theoretically guaranteed, and therefore, DC coupling and separate transmission of a clock are necessary.

In the active video interval, the data reception unit 202 receives the differential signal corresponding to the pixel data transmitted unidirectionally from the data transmission unit 102 through the plurality of channels. In the horizontal blanking interval or the vertical blanking interval, the data reception unit 202 also receives the differential signal corresponding to the audio data and the control data transmitted unidirectionally from the data transmission unit 102 through the plurality of channels.

Specifically, the data reception unit 202 includes an HDMI receiver 221. Through the TMDS channels #0, #1, and #2, the HDMI receiver 221 receives the differential signal corresponding to the pixel data and the differential signal corresponding to the audio data and the control data, which are transmitted unidirectionally from the data transmission unit 102 connected thereto via the HDMI cable 300, in synchronization with the pixel clocks also transmitted from the data transmission unit 102 through the TMDS clock channel.

Note that, in the example described above, image data, audio data, and control data are transmitted through the TMDS channels #0, #1, and #2, and pixel clocks are transmitted through the TMDS clock channel. However, this is compatible with HDMI 1.4 or older, and HDMI 2.0. In the case of HDMI 2.1, transmission using the FRL lanes #0, #1, #2, and #3 is performed. In this case, the TMDS clock channel in FIG. 3 is the FRL lane #3.

In this case, data transmission with a fixed rate link (FRL) packet using the three lanes #0 to #2 or the four lanes #0 to #3 is performed. Here, FRL character coding is 16-bit/18-bit conversion coding for converting 16-bit data into 18-bit data, is coding for maintaining DC balance, and is coding capable of clock extraction.

FIG. 4 shows an example of link rates and the numbers of lanes corresponding to the respective links. At the link rate identified by "1" (0001 in binary) and "2" (0010 in binary), three lanes #0 to #2 among the four lanes #0 to #3 are used. In this case, the lane #3 is an inactive lane. Note that an active lane means a lane for transmitting data. Meanwhile, all the four lanes #0 to #3 are used at the link rates identified by "3" (0011 in binary), "4" (0100 in binary), "5" (0101 in binary), and "6" (0110 in binary).

In the example shown in the drawing, at the link rate identified by "1" (0001 in binary), the bitrate per lane is 3 Gbps. Meanwhile, at the link rates identified by "2" (0010 in binary) and "3" (0011 in binary), the bitrate per lane is 6 Gbps. Further, at the link rate identified by "4" (0100 in binary), the bitrate per lane is 8 Gbps. Further, at the link rate identified by "5" (0101 in binary), the bitrate per lane is 10 Gbps. Furthermore, at the link rate identified by "6" (0110 in binary), the bitrate per lane is 12 Gbps.

Referring back to FIG. 3, the transmission channels of the HDMI system including the data transmission unit 102 and the data reception unit 202 include a transmission channel called a display data channel (DDC). The DDC includes two signal lines (not shown) included in the HDMI cable 300, and conducts inter-integrated circuit (IIC) communication between the data transmission unit 102 and the data reception unit 202.

Specifically, the data transmission unit 102 includes an IIC master block 122. The data reception unit 202 also includes a memory unit 222. The memory unit 222 includes an extended display identification data ROM (EDID ROM)

231, a status and control data channel (SCDC) register unit 232, and a high-bandwidth digital content protection (HDCP) register unit 233.

In the EDID ROM 231, the EDID that is information regarding the configuration and the executable functions (configuration/capability) of the sink device 200 is set, and is read into the side of the source device 100 by the IIC master block 122 through the DDC. As a result, the source device 100 recognizes the configuration and the executable functions of the sink device 200. Note that the EDID ROM 231 is formed with a rewritable memory such as an electrically erasable programmable read-only memory (EEPROM) or a flash memory, for example, but may be formed with a random access memory (RAM) or any other storage medium.

In this embodiment, when it is determined that the data transmission unit 102 is compatible with any of HDMI 2.1, HDMI 2.0, and HDMI 1.4 or older, the EDID for HDMI 2.1, the EDID for HDMI 2.0, and the EDID for HDMI 1.4 or older are set in the EDID ROM 231, and the set EDIDs are read into the side of the source device 100.

The status and control data channel (SCDC) corresponds to the point-to-point communication protocol by which the source device 100 and the sink device 200 exchange data. Note that this SCDC is defined in HDMI 2.0 and later. The SCDC register unit 232 includes registers that store SCDC structures (SCDCS).

The source device 100 (the data transmission unit 102) can read and write the SCDCS data stored in the SCDC register unit 232 with the IIC master block 122 through the DDC. The SCDCS data includes data regarding the current link state, data for controlling the operation of the source device, and the like.

High-bandwidth digital content protection (HDCP) is an encryption technology for preventing unauthorized duplication of video content protected by copyright while the video content is being transmitted to a display device. The HDCP register unit 233 includes registers that store data related to HDCP. Examples of the data related to HDCP include an encryption key for encrypting image data.

The source device 100 (the data transmission unit 102) can read and write the HDCP-related data stored in the HDCP register unit 233 with the IIC master block 122 through the DDC.

Further, although not shown in the drawing, the HDMI cable 300 includes a consumer electronics control (CEC) line, a hot plug detect (HPD) line, a reserve line, a power-supply line, and the like. The CEC line is used for conducting bidirectional communication of control data between the source device 100 and the sink device 200. The HPD line is used by the source device 100 to detect connection to the sink device 200, or the like.

EDID Automatic Switching Control Process

Figure 5:
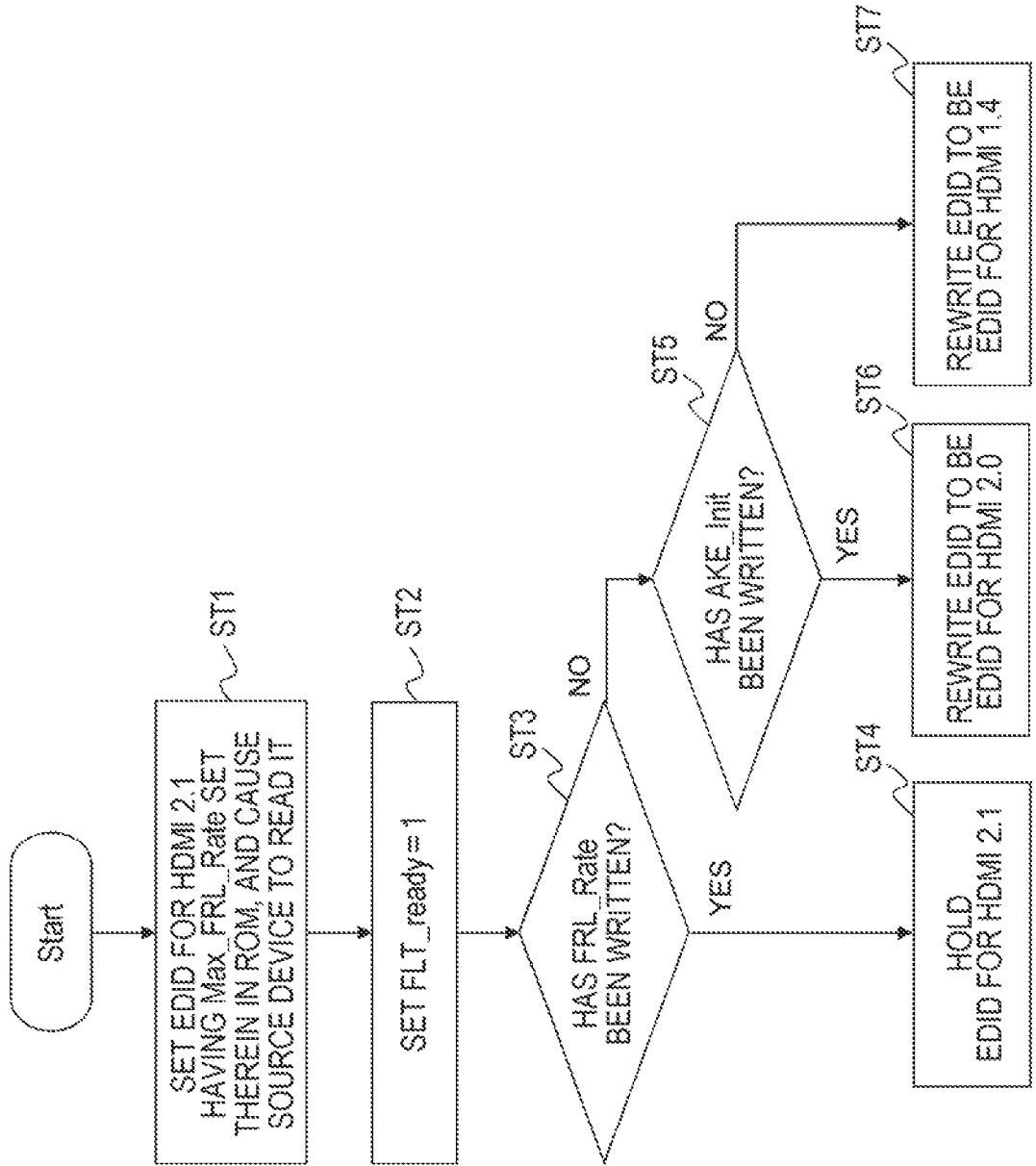
FIG. 5 is a flowchart showing an example of the procedures of an EDID automatic switching control process in the control unit of the sink device.

Referring now to a flowchart in FIG. 5, an example of the procedures of an EDID automatic switching control process in the control unit 203 of the sink device 200 is described.

In step ST1, the control unit 203 sets the EDID (Enhanced (4K HFR/8K)) for HDMI 2.1 in the EDID ROM 231, and causes the source device 100 to read this EDID. In this case, the control unit 203 sets the hot plug detect (HPD) line (not shown) to high level, to cause the source device 100 to read the EDID for HDMI 2.1 set in the EDID ROM 231.

Figure 6:
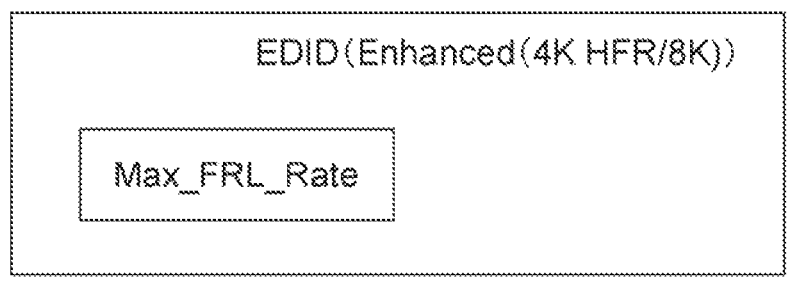
FIG. 6 is a table schematically showing the EDID for HDMI 2.1.

FIG. 6 schematically shows the EDID for HDMI 2.1. This EDID for HDMI 2.1 includes data "Max_FRL_Rate". The EDID includes an HDMI forum vendor specific data block (HF-VSDB). The data "Max_FRL_Rate" is data in the HF-VSDB. This data "Max_FRL_Rate" is a data item that designates the maximum link rate that can be supported by the sink device 200. This data Max_FRL_Rate" is 4-bit field data that designates the link rate identifier (see FIG. 4) of the maximum link rate that can be supported by the sink device 200.

For example, when the data "Max_FRL_Rate" is a value of "5", it indicates that the sink device 200 supports the link rates associated with the link rate identifiers "1", "2", "3", "4", and "5", but does not support the link rate associated with the link rate identifier "6".

Further, there are cases where the value of "Max_FRL_Rate" also indicates whether the sink device 200 supports link training. For example, in a case where a multimedia link is the HDMI, there is a possibility that a value of "Max_FRL_Rate" is "0". In that case, it indicates that the sink device 200 supports HDMI operations compliant with HDMI 1.4 or older or HDMI 2.0. That is, in a case where the value of "Max_FRL_Rate" is "0", it indicates that the sink device 200 does not support any of the link rates shown in FIG. 4.

Link training is not performed according to HDMI 1.4 or older or HDMI 2.0. Therefore, the value "0" of "Max_FRL_Rate" indicates that the sink device 200 does not support link training, and the values "1" to "6" of "Max_FRL_Rate" indicate that the sink device 200 supports link training.

Referring back to FIG. 5, in step ST2, the control unit 203 sets "FLT_ready" included in SCDC data existing in the SCDC register unit 232 to "1".

Figure 7:
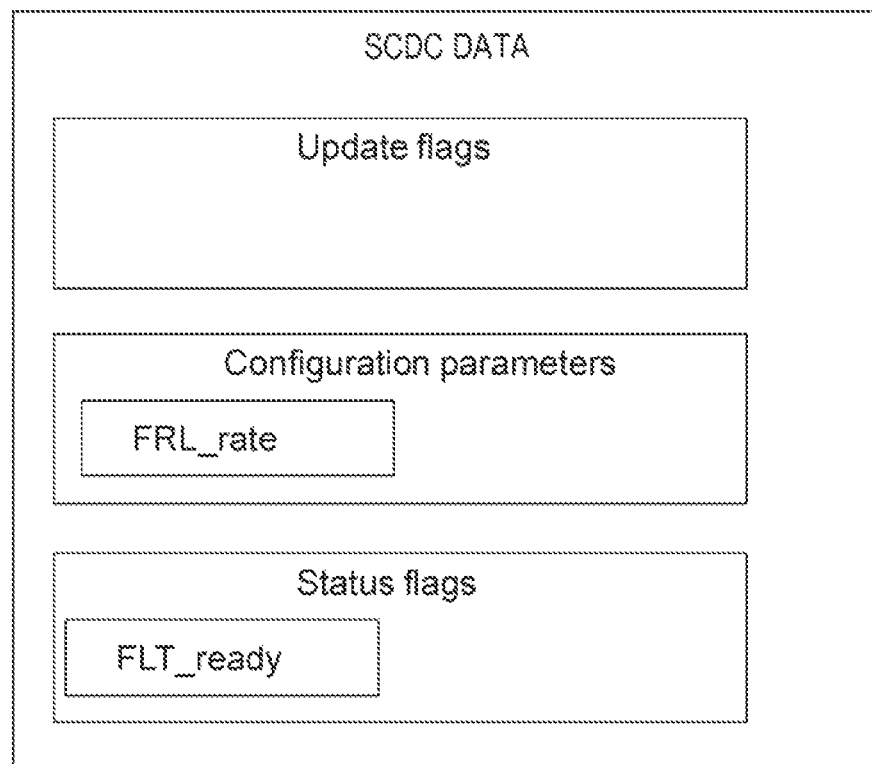
FIG. 7 is a table schematically showing SCDC data stored in an SCDC register unit.

FIG. 7 schematically shows the SCDC data stored in the SCDC register unit 232. The SCDC data includes three categories of data items: update flags, configuration parameters, and status flags. The status flags are values indicating the current status of the sink device 200.

The update flags are values (such as 1-bit binary values) associated with instructions of the source device 100. In a case where the source device 100 is compatible with HDMI 2.1, a source link training circuit (not shown) polls an update flag periodically, such as every two milliseconds, for example.

In a case where one of the update flags has a value "1" when polled by the source link training circuit, for example, the source link training circuit executes the instruction associated with the update flag. In this manner, an update flag provides a method for controlling the link training circuit of the source device 100.

The status flags include "FLT_ready". A link training control circuit (not shown) of the sink device 200 writes "1" into "FLT_ready" as described above, to indicate to the source device 100 that the sink device 200 is ready to start a link training process.

The configuration parameters are the current data transmission parameters of the HDMI link. The configuration parameters include "FRL_Rate". "FRL_Rate" is the link rate identifier of the current link rate. For example, in a case where the example of link rates and link rate identifiers shown in FIG. 4 is used, "FRL_Rate" is 4-bit field data, and stores the link rate identifier (Binary) of the link rate at which the HDMI link is currently operating.

In the source device 100 compatible with HDMI 2.1, the source link training circuit reads the EDID for the HDMI 2.1 (see FIG. 6) set in the EDID ROM, via the DDC as described above. Specifically, the source link training circuit reads "Max_FRL_Rate", and determines whether the sink device 200 supports link training.

In a case where the sink device 200 is compatible with HDMI 1.4 or older or HDMI 2.0, the sink device 200 does not support link training. In that case, the value of "Max_FRL_Rate" is "0". In this embodiment, the sink device 200 is compatible with HDMI 2.1, and the source link training circuit reads the EDID for HDMI 2.1 (see FIG. 6). Accordingly, the value of "Max_FRL_Rate" is a value other than "0".

When the value of "Max_FRL_Rate" is other than "0", the source link training circuit of the source device 100 and the link training control circuit of the sink device 200 perform some actions to prepare the HDMI link for a link training process. The link training control circuit writes the value 1 into "FLT_ready", to indicate that the sink device 200 is ready to start a link training process.

The source link training circuit reads "FLT_ready" periodically, such as every two milliseconds, for example. In a case where the source link training circuit reads "1" as the value of "FLT_ready", the source link training circuit selects a link rate, and writes the identifier of the selected link rate into the register of "FRL_Rate". The source link training circuit selects a link rate that is equal to or lower than the value of the maximum link rate designed in "Max_FRL_Rate", and is high enough to support transmission of content.

Referring back to FIG. 5, in step ST3, the control unit 203 determines whether or not the register of "FRL_Rate" has been rewritten, or whether or not the identifier of a link rate has been written into the register of "FRL_Rate". If it is determined that the identifier of a link rate has been written into the register of "FRL_Rate", the control unit 203 determines to cause the source device 100 to read the EDID for HDMI 2.1, because the source device 100 supports link training when such writing is performed as described above. In step ST4, the EDID for HDMI 2.1 is held in the EDID ROM 231.

Note that, in this case, the EDID for HDMI 2.1 has already been read into the source device 100 (as described in the explanation of step ST1). Therefore, at this point, it is not necessary to cause the source device 100 to read the EDID for HDMI 2.1 held in the EDID ROM 231, but the EDID may be read again.

If it is determined in step ST3 that the identifier of a link rate has not been written into the register of "FRL_Rate", on the other hand, the control unit 203 moves on to the process in step ST5. As described above, the reading of "FLT_ready" is performed periodically, such as every two milliseconds, for example. Therefore, this determination is performed after a time that is at least equal to or longer than the time interval of reading of "FLT_ready" has elapsed since the value 1 was written into "FLT_ready", for example.

In step ST5, the control unit 203 determines whether "AKE_Init" has been written. The image data to be transmitted from the source device 100 to the sink device 200 via the HDMI cable 300 is encrypted by high-bandwidth digital content protection (HDCP). By HDMI 2.0 and HDMI 2.1, HDCP 2.2 is adopted.

The source device 100 performs an authentication process to determine whether the sink device 200 has a proper HDCP processing function, with the sink device 200 via the DDC. According to HDCP 2.2, an authentication and key exchange (AKE) process for exchanging encryption keys is performed as the first step of the authentication protocol. "AKE_Init" is the authentication start message that is transmitted from the source device (HDCP transmitter) 100 to the sink device (HDCP receiver) 200 at the beginning of this AKE process.

Figure 8:
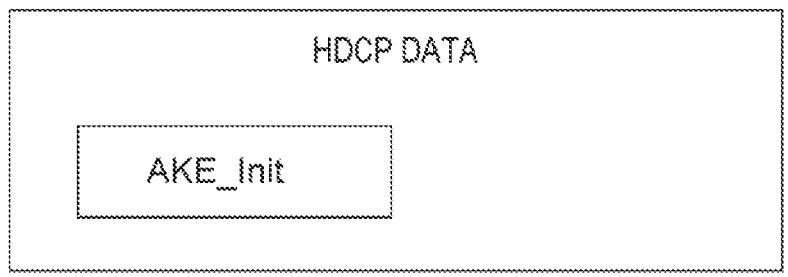
FIG. 8 is a table schematically showing HDCP data stored in an HDCP register unit.

The sink device 200 receives "AKE_Init" transmitted from the source device 100, and writes it at the corresponding address in the HDCP register unit 233. FIG. 8 schematically shows HDCP data stored in the HDCP register unit 233. The HDCP data includes data of "AKE_Init".

FIG. 9, part (a) shows an example structure (syntax) of "AKE_Init", and FIG. 9, part (b) shows the contents (semantics) of relevant information in the example structure. The 1-byte field of "msg_id (=2)" is a message identifier indicating that the message is "AKE_Init". The 8-byte field of "rTX [63, 0]" is a pseudorandom value. The 3-byte field of "TxCaps" is a fixed value (0x02 0x00 0x00) including version information.

Referring back to FIG. 5, if it is determined in step ST5 that "AKE_Init" has been written, the control unit 203 determines to cause the source device 100 to read the EDID for HDMI 2.0. This is because "AKE_Init" is written in a case where the source device 100 adopts HDCP 2.2 as described above, and HDMI 2.0 adopts HDCP 2.2. In step ST6, the EDID held in the EDID ROM 231 is rewritten to be the EDID (Enhanced) for HDMI 2.0. After this rewriting, the control unit 203 then sets the HPD line at high level, to cause the source device 100 to read the EDID for HDMI 2.0 set in the EDID ROM 231.

If it is determined in step ST5 that "AKE_Init" has not been written, on the other hand, the control unit 203 determines to cause the source device 100 to read the EDID (Standard) for HDMI 1.4 or older, and, in step ST7, rewrites the EDID held in the EDID ROM 231 to be the EDID for HDMI 1.4 or older. After this rewriting, the control unit 203 then sets the HPD line at high level, to cause the source device 100 to read the EDID for HDMI 1.4 or older set in the EDID ROM 231. This determination is performed after at least a predetermined time, such as a time that is equal to or longer than several 100 milliseconds, has elapsed since the value 1 was written into "FLT_ready", for example.

As described above, in the transmission/reception system 10 shown in FIG. 1, the sink device 200 determines whether the source device 100 is compatible with HDMI 2.1, HDMI 2.0, or HDMI 1.4 or older, sets the EDID of the version corresponding to the determination result in the EDID ROM 231, and causes the source device 100 to read the EDID. Accordingly, the user does not need to set the EDID of the version compatible with the source device 100 in the EDID ROM 231 in the sink device 200. Thus, user-friendliness can be increased.

2. MODIFICATIONS

Note that, in the example described in the above embodiment, the sink device 200 handles 256-byte EDID "Standard" as the EDID for HDMI 1.4 or older, 256-byte EDID "Enhanced" as the EDID for HDMI 2.0, and 512-byte EDID "Enhanced (4K HFR/8K)" as the EDID for HDMI 2.1, which are shown in FIG. 2, part (b).

However, it is also possible to adopt an example in which the sink device 200 handles 256-byte EDID "Standard" as the EDID for HDMI 1.4 or older, 256-byte EDID "Enhanced" as the EDID for HDMI 2.0, 256-byte EDID "Enhanced (4K HFR)" as the EDID for HDMI 2.1, and 256-byte EDID "Enhanced (8K)" as the EDID for HDMI 2.1, which are shown in FIG. 2, part (a).

Figure 10:
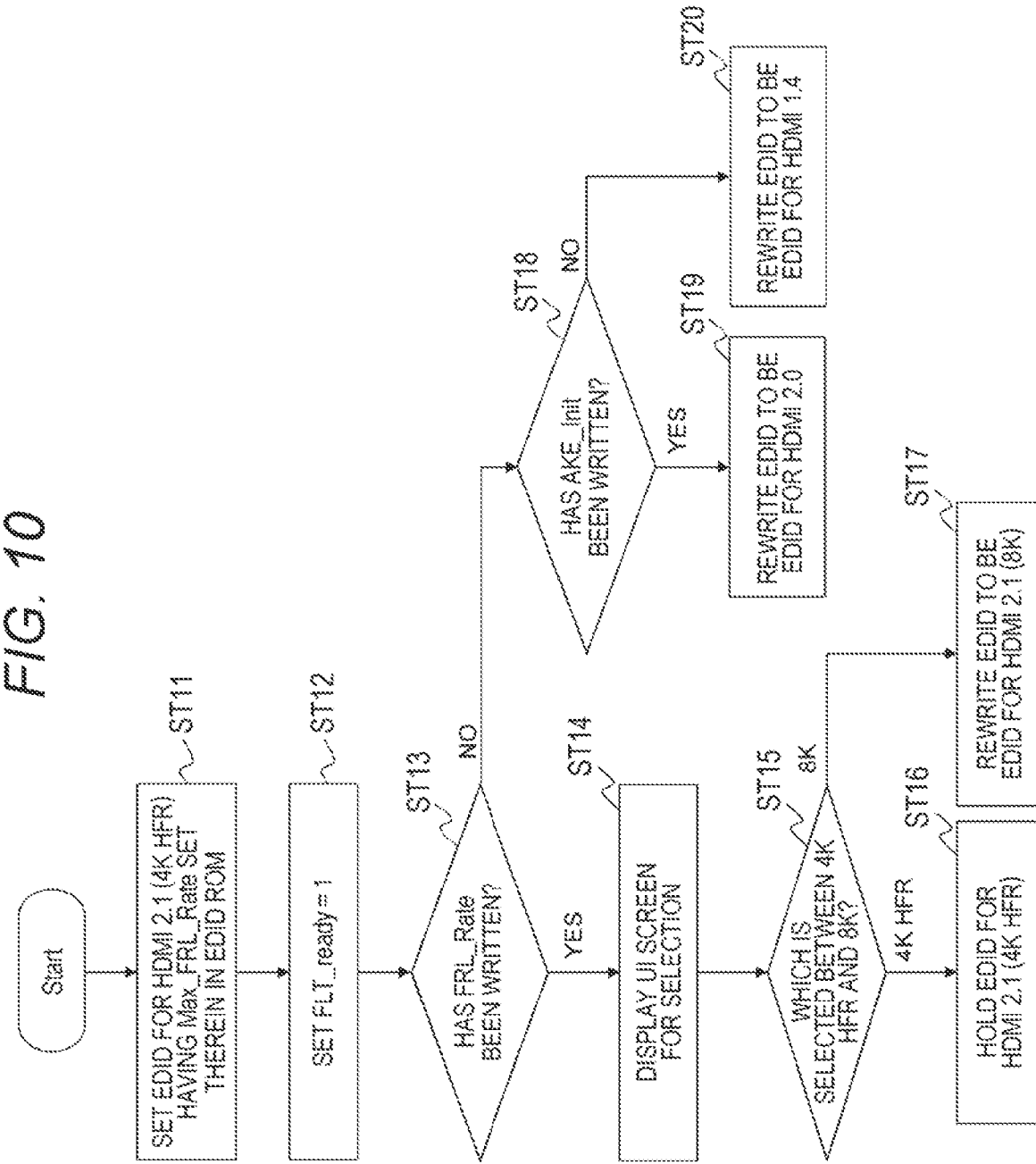
FIG. 10 is a flowchart showing another example of the procedures of an EDID automatic switching control process in the control unit of the sink device.

A flowchart in FIG. 10 shows an example of the procedures of an EDID automatic switching control process in the control unit 203 of the sink device 200 in that case.

In step ST11, the control unit 203 sets the EDID for HDMI 2.1 (4K HFR) in the EDID ROM 231, and causes the source device 100 to read this EDID. In this case, the control unit 203 sets the hot plug detect (HPD) line (not shown) to high level, to cause the source device 100 to read the EDID for HDMI 2.1 (4K HFR) set in the EDID ROM 231. This EDID for HDMI 2.1 (4K HFR) also includes data of "Max_FRL_Rate" (see FIG. 6).

Next, in step ST12, the control unit 203 sets "FLT_ready" included in the SCDC data existing in the SCDC register unit 232 to "1". The source link training circuit of the source device 100 reads "FLT_ready" periodically, such as every two milliseconds, for example. In a case where the source link training circuit reads "1" as the value of "FLT_ready", the source link training circuit selects a link rate, and writes the identifier of the selected link rate into the register of "FRL_Rate".

Next, in step ST13, the control unit 203 determines whether or not the register of "FRL_Rate" has been rewritten, or whether or not the identifier of a link rate has been written into the register of "FRL_Rate".

Figure 11:
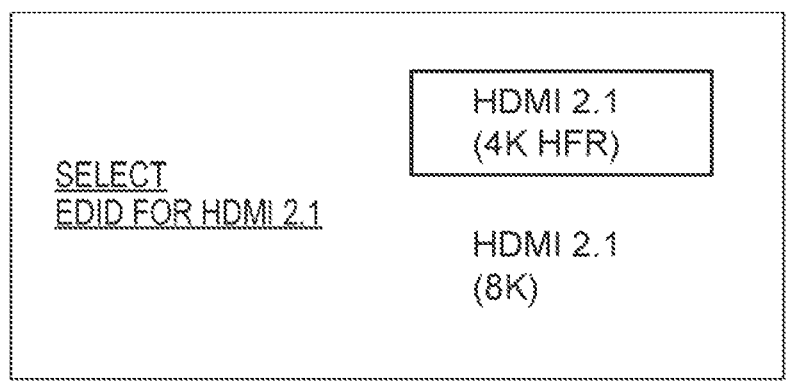
FIG. 11 is a diagram showing an example of a UI screen for selecting either the EDID for HDMI 2.1 (4K HFR) or the EDID for HDMI 2.1 (8K).

If it is determined that the identifier of a link rate has been written into the register of "FRL_Rate", the control unit 203 in step ST14 displays a user interface (UI) screen for allowing the user to select either the EDID for HDMI 2.1 (4K HFR) or the EDID for HDMI 2.1 (8K) on a display unit (not shown), because this writing is performed in the case of HDMI 2.1 by which the source device 100 supports link training. FIG. 11 shows an example of the UI screen. For example, the user refers to this UI screen, to select either "4K HFR" or "8K", for example. The example shown in the drawing illustrates a state in which the EDID for HDMI 2.1 (4 K HFR) is selected.

Next, in step ST15, the control unit 203 determines whether "4 K HFR" is selected, or whether "8 K" is selected. If it is determined that "4K HFR" is selected, the control unit 203 determines to cause the source device 100 to read the EDID for HDMI 2.1 (4K HFR), and, in step ST16, keeps the EDID for HDMI 2.1 (4K HFR) held in the EDID ROM 231.

Note that, in this case, the EDID for HDMI 2.1 (4K HFR) has already been read into the source device 100 (as described in the explanation of step ST11). Therefore, at this point, it is not necessary to cause the source device 100 to read the EDID for HDMI 2.1 (4K HFR) held in the EDID ROM 231, but the EDID may be read again.

If it is determined in step ST15 that "8K" is selected, on the other hand, the control unit 203 determines to cause the source device 100 to read the EDID for HDMI 2.1 (8K), and, in step ST17, rewrites the EDID held in the EDID ROM 231 to be the EDID for HDMI 2.1 (8K). After this rewriting, the control unit 203 then sets the HPD line at high level, to cause the source device 100 to read the EDID for HDMI 2.1 (8K) set in the EDID ROM 231.

If it is determined in step ST13 that the identifier of a link rate has not been written into the register of "FRL_Rate", on the other hand, the control unit 203 moves on to the process in step ST18. As described above, the reading of "FLT_ready" is performed periodically, such as every two milliseconds, for example. Therefore, this determination is performed after a time that is at least equal to or longer than the time interval of reading of "FLT_ready" has elapsed since the value 1 was written into "FLT_ready", for example.

In step ST18, the control unit 203 determines whether "AKE_Init" has been written. The image data to be transmitted from the source device 100 to the sink device 200 via the HDMI cable 300 is encrypted by high-bandwidth digital content protection (HDCP). By HDMI 2.0 and HDMI 2.1, HDCP 2.2 is adopted.

The source device 100 performs an authentication process to determine whether the sink device 200 has a proper HDCP processing function, with the sink device 200 via the DDC. According to HDCP 2.2, an authentication and key exchange (AKE) process for exchanging encryption keys is performed as the first step of the authentication protocol. "AKE_Init" is the authentication start message that is transmitted from the source device (HDCP transmitter) 100 to the sink device (HDCP receiver) 200 at the beginning of this AKE process.

If it is determined in step ST18 that "AKE_Init" has been written, the control unit 203 determines to cause the source device 100 to read the EDID for HDMI 2.0. This is because "AKE_Init" is written in a case where the source device 100 adopts HDCP 2.2 as described above, and HDMI 2.0 adopts HDCP 2.2.

In step ST19, the control unit 203 then rewrites the EDID held in the EDID ROM 231 to be the EDID for HDMI 2.0. After this rewriting, the control unit 203 then sets the HPD line at high level, to cause the source device 100 to read the EDID for HDMI 2.0 set in the EDID ROM 231.

If it is determined in step ST18 that "AKE_Init" has not been written, on the other hand, the control unit 203 determines to cause the source device 100 to read the EDID for HDMI 1.4 or older. This determination is performed after at least a predetermined time, such as a time that is equal to or longer than several 100 milliseconds, has elapsed since the value 1 was written into "FLT_ready", for example.

In step ST20, the control unit 203 then rewrites the EDID held in the EDID ROM 231 to be the EDID for HDMI 1.4 or older. After this rewriting, the control unit 203 then sets the HPD line at high level, to cause the source device 100 to read the EDID for HDMI 1.4 or older set in the EDID ROM 231.

Note that, in the example of the EDID automatic switching control process shown in the flowchart in FIG. 10, in step ST11, the EDID for HDMI 2.1 (4K HFR) is set in the EDID ROM 231, and the source device 100 is made to read this EDID. However, in step ST11, the EDID for HDMI 2.1 (8K) may be set in the EDID ROM 231, and the source device 100 may be made to read this EDID.

Also, in the example described in the above embodiment, the interface (multimedia link) is HDMI. The present technology can also be applied to other interfaces that handle similar EDIDs in a manner similar to the above. Examples of other interfaces include a display port (DP) interface and a mobile high-definition link (MHL). Furthermore, in the example described in the above embodiment, the version of the HDMI is HDMI 2.1, HDMI 2.0, or HDMI 1.4 or older. However, the present technology is not limited to such an example, and may be applied to a future version of HDMI. Also, in the embodiment described above, HDCP 2.2 is used. However, the present technology may be embodied with a version of HDCP older than HDCP 2.2 or a version of HDCP newer than HDCP 2.2.

Furthermore, in the above embodiment, the EDID for HDMI 2.1 is stored at the beginning in step ST1 or step ST11. However, the EDID for HDMI 1.4 or older, or the EDID for HDMI 2.0 may be stored at the beginning, and be switched to the EDID for HDMI 2.1 in response to writing of "FRL_Rate".

Furthermore, while preferred embodiments of the present disclosure have been described above with reference to the accompanying drawings, the technical scope of the present disclosure is not limited to those examples. It is apparent that those who have ordinary skills in the technical field of the present disclosure can make various changes or modifications within the scope of the technical spirit claimed herein, and it should be understood that those changes or modifications are within the technical scope of the present disclosure.

Furthermore, the effects disclosed in this specification are merely illustrative or exemplary, but are not restrictive. That is, the technology according to the present disclosure may achieve other effects obvious to those skilled in the art from the description in the present specification, in addition to or instead of the effects described above.

Note that the present technology can also be embodied in the configurations described below.

(1) A reception device including:
a memory unit that stores first device information and second device information;
a communication unit that communicates with an external device; and
a control unit that determines to cause the external device to read the second device information, on the basis of reception of a rewrite signal for the first device information from the external device.

(2) The reception device according to (1), in which
the memory unit further stores third device information, and,
when the rewrite signal is not received, the control unit determines to cause the external device to read the third device information.

(3) The reception device according to (2), in which
the second device information is information compliant with version 2.1 of high-definition multimedia interface (HDMI), and the third device information is information compliant with version 2.0 of HDMI.

(4) The reception device according to (3), in which
each of the second device information and the third device information is extended display identification data (EDID) including an HDMI forum vendor specific data block (HF-VSDB) that is information regarding a function supported by a device.

(5) The reception device according to (3), in which
the second device information is 512-byte EDID obtained by combining EDID for 4K high frame rate (HFR) and EDID for 8K.

(6) The reception device according to any one of (2) to (5), in which
the memory unit further stores fourth device information, and,
when the external device is compatible with neither the second device information nor the third device information, the control unit determines to cause the external device to read the fourth device information.

(7) The reception device according to (6), in which,
when a predetermined signal is not received from the external device, the control unit determines that the external device is compatible with neither the second device information nor the third device information.

(8) The reception device according to (7), in which
the predetermined signal is AKE_Init, which is a start signal for an authentication process with the external device.

(9) The reception device according to any one of (6) to (8), in which
the fourth device information is information compliant with version 1.4 or older of high-definition multimedia interface (HDMI).

(10) The reception device according to (9), in which
the fourth device information is extended display identification data (EDID) including a vendor specific data block (VSDB) that is information regarding a function supported by a device.

(11) The reception device according to any one of (1) to (10), in which
the rewrite signal is determined depending on the second device information.

(12) The reception device according to (11), in which
the rewrite signal is information corresponding to Max_FRL_Rate, which is information regarding a link rate supported by a device, Max_FRL_Rate being written in the second device information.

(13) The reception device according to any one of (1) to (12), in which
the rewrite signal is transmitted in accordance with a value of FLT_ready, which is information indicating a preparation status of a link training process, FLT_ready being written in the first device information.

(14) The reception device according to any one of (1) to (13), in which
the first device information is information included in a status and control data channel structure (SCDCS).

(15) The reception device according to (14), in which
the first device information is FRL_Rate, which is information regarding a link rate selected by the external device.

(16) The reception device according to any one of (1) to (15), in which
the communication unit communicates with the external device through a digital interface cable.

(17) The reception device according to (16), in which
the digital interface cable is a high-definition multimedia interface (HDMI) cable.

(18) The reception device according to any one of (1) to (17), in which
the reception device includes a display device.

(19) A method for controlling a reception device that includes:
a memory unit that stores first device information and second device information; and
a communication unit that communicates with an external device,
the method including
determining to cause the external device to read the second device information, on the basis of reception of a rewrite signal for the first device information from the external device.

(20) A transmission/reception system including a transmission device and a reception device,
in which the reception device includes:
a memory unit that stores first device information and second device information;
a communication unit that communicates with the transmission device; and
a control unit that determines to cause the transmission device to read the second device information, on the basis of reception of a rewrite signal for the first device information from the transmission device.

REFERENCE SIGNS LIST

10 Transmission/reception system
100 Source device (transmission device)
101 Receptacle
102 Data transmission unit (HDMI transmission unit)
103 Control unit 121 HDMI transmitter
122 IIC master block
200 Sink device (reception device)
201 Receptacle
202 Data reception unit (HDMI reception unit)
203 Control unit
221 HDMI receiver
222 Memory unit
231 EDID ROM
232 SCDC register unit
233 HDCP register unit
300 HDMI cable
301, 302 Plug

The invention claimed is:

1. A reception device comprising circuitry configured to:
store first device information and second device information;
bidirectionally communicate with an external device;
cause the external device to read the second device information, on a basis of reception of a rewrite signal for the first device information from the external device;
store third device information, and
when the rewrite signal is not received, cause the external device to read the third device information,
wherein the first device information is information regarding a link rate selected by the external device, and the second device information is information compliant with version 2.1 of high-definition multimedia interface (HDMI).

2. The reception device according to claim 1, wherein the third device information is information compliant with version 2.0 of HDMI.

3. The reception device according to claim 2, wherein each of the second device information and the third device information are extended display identification data (EDID) including a vendor specific data block that is information regarding a function supported by the reception device.

4. The reception device according to claim 2, wherein the second device information is 512-byte EDID obtained by combining EDID for 4K high frame rate (HFR) and EDID for 8K.

5. The reception device according to claim 1, wherein the circuitry is further configured to store fourth device information, and,
when the external device is compatible with neither the second device information nor the third device information, the circuitry is further configured to cause the external device to read the fourth device information.

6. The reception device according to claim 5, wherein, when a predetermined signal is not received from the external device, the circuitry is further configured to determine that the external device is compatible with neither the second device information nor the third device information.

7. The reception device according to claim 6, wherein the predetermined signal is AKE_Init, which is a start signal for an authentication process with the external device.

8. The reception device according to claim 5, wherein the fourth device information is information compliant with version 1.4 of HDMI or older.

9. The reception device according to claim 8, wherein the fourth device information is extended display identification data (EDID) including a vendor specific data block (VSDB) that is information regarding a function supported by the reception device.

10. The reception device according to claim 1, wherein the rewrite signal is determined depending on the second device information.

11. The reception device according to claim 10, wherein the rewrite signal is information corresponding to Max_FRL_Rate, which is information regarding a link rate supported by the reception device, Max_FRL_Rate being written in the second device information.

12. The reception device according to claim 1, wherein the rewrite signal is transmitted in accordance with a value of FLT_ready, which is information indicating a preparation status of a link training, FLT_ready being written in the first device information.

13. The reception device according to claim 1, wherein the first device information is information included in a status and control data channel structure (SCDCS).

14. The reception device according to claim 13, wherein the first device information is FRL_Rate, which is the information regarding the link rate selected by the external device.

15. The reception device according to claim 1, wherein the circuitry is further configured to communicate with the external device through a digital interface cable.

16. The reception device according to claim 15, wherein the digital interface cable is a HDMI cable.

17. The reception device according to claim 1, wherein the first device information is information that includes at least one flag indicating a current status of the reception device.

18. A reception device comprising:
a memory configured to store first device information and second device information;
bidirectional communication circuitry configured to communicate with an external device regarding the first device information; and
circuitry configured to:
receive information for the first device information from the external device,
cause the external device to read the second device information, on a basis of reception of the information for the first device information from the external device,
store third device information, and
when the information for the first device information is not received, cause the external device to read the third device information,
wherein the first device information is information regarding a link rate selected by the external device, and the second device information is information compliant with version 2.1 of high-definition multimedia interface (HDMI).

19. A reception device comprising:
a memory configured to store first device information and second device information;
bidirectional communication circuitry configured to communicate with an external device regarding the first device information; and
circuitry configured to;
receive information for the first device information from the external device,
cause the external device to read the second device information, on a basis of reception of the information for the first device information from the external device, store third device information, and when the information for the first device information is not received, cause the external device to read the third device information, wherein the information for the first device information is received in accordance with information indicating a preparation status of a link training, and the second device information is information compliant with version 2.1 of high-definition multimedia interface (HDMI).

20. The reception device according to claim 19, wherein the third device information
information compliant with version 2.0 of HDMI.

* * * * *